(12) United States Patent
Grul

(10) Patent No.: US 10,905,092 B2
(45) Date of Patent: Feb. 2, 2021

(54) PET CARRIER INCLUDING DETACHABLE LITTER BOX

(71) Applicant: Renee Grul, Bartlesville, OK (US)

(72) Inventor: Renee Grul, Bartlesville, OK (US)

( * ) Notice: Subject to any disclaimer, the term of this patent is extended or adjusted under 35 U.S.C. 154(b) by 0 days.

(21) Appl. No.: 16/705,642

(22) Filed: Dec. 6, 2019

(65) Prior Publication Data

US 2020/0107519 A1 Apr. 9, 2020

Related U.S. Application Data

(63) Continuation-in-part of application No. 15/426,419, filed on Feb. 7, 2017.

(60) Provisional application No. 62/292,893, filed on Feb. 9, 2016.

(51) Int. Cl.
| | | |
|---|---|---|
| A01K 1/01 | (2006.01) | |
| A01K 1/02 | (2006.01) | |
| A01K 1/00 | (2006.01) | |
| A01K 1/015 | (2006.01) | |

(52) U.S. Cl.
CPC .......... *A01K 1/0114* (2013.01); *A01K 1/0064* (2013.01); *A01K 1/0151* (2013.01); *A01K 1/0245* (2013.01)

(58) Field of Classification Search
CPC .. A01K 1/0114; A01K 1/0035; A01K 1/0064; A01K 1/0151; A01K 1/0152; A01K 1/0236

See application file for complete search history.

(56) References Cited

U.S. PATENT DOCUMENTS

| | | | | | |
|---|---|---|---|---|---|
| 4,522,150 A | * | 6/1985 | Gershman | ............ | A01K 1/0114 119/165 |
| 5,211,133 A | * | 5/1993 | Foley | .................... | A01K 1/0114 119/165 |
| 5,564,364 A | * | 10/1996 | Kovacs | ................ | A01K 1/0107 119/163 |
| 5,806,461 A | * | 9/1998 | Kiera | .................... | A01K 1/0107 119/165 |

(Continued)

FOREIGN PATENT DOCUMENTS

| | | | | |
|---|---|---|---|---|
| CA | 2951059 A1 | * | 6/2017 | ........... A01K 1/0114 |
| DE | 10047099 A1 | * | 4/2002 | ........... A01K 1/0107 |

(Continued)

*Primary Examiner* — Monica L Barlow
*Assistant Examiner* — Aaron M Rodziwicz
(74) *Attorney, Agent, or Firm* — Clements Bernard Walker; Christopher L. Bernard

(57) ABSTRACT

A pet carrier assembly, including: a cage housing adapted to selectively contain a pet; and a lower litter pan adapted to be selectively coupled to and removed from a bottom portion of the cage housing; wherein bottom portion of the cage housing includes a waste grate that forms at least a portion of a floor of the cage housing and is selectively disposed within or adjacent to an interior portion of the lower litter pan with the bottom portion of the cage housing. The pet carrier assembly includes a solid removable floor disposed in the bottom portion of the cage housing and adapted to cover the waste grate, and a seal disposed about a periphery of the removable floor. Optionally, the lower litter pan includes a cut away operable for providing access to an interior portion of the lower litter pan.

20 Claims, 4 Drawing Sheets

(56) References Cited

U.S. PATENT DOCUMENTS

| | | | | |
|---|---|---|---|---|
| 6,295,949 B1 * | 10/2001 | Willis | .................. | A01K 1/0114 |
| | | | | 119/165 |
| 6,371,048 B1 * | 4/2002 | Smith | .................. | A01K 1/0114 |
| | | | | 119/166 |
| 6,631,590 B1 * | 10/2003 | Glowaski | ............... | A01K 1/033 |
| | | | | 135/160 |
| 7,017,519 B1 * | 3/2006 | Deasy | .................... | A01K 1/011 |
| | | | | 119/166 |
| 7,849,818 B2 * | 12/2010 | Matsuo | ................ | A01K 1/0107 |
| | | | | 119/165 |
| 2002/0000205 A1 * | 1/2002 | Yamamoto | ........... | A01K 1/0114 |
| | | | | 119/161 |
| 2005/0211179 A1 * | 9/2005 | Lewis, II | ............. | A01K 1/0107 |
| | | | | 119/168 |
| 2012/0291712 A1 * | 11/2012 | Wallace | .................. | B32B 27/34 |
| | | | | 119/167 |
| 2015/0020743 A1 * | 1/2015 | Bauer | .................. | A01K 1/0107 |
| | | | | 119/166 |

FOREIGN PATENT DOCUMENTS

| | | | | | |
|---|---|---|---|---|---|
| DE | | 10100601 A1 * | 7/2002 | ........... | A01K 1/0107 |
| DE | 202009018125 U1 * | | 4/2011 | ............... | B60Q 1/56 |
| WO | WO-8701259 A1 * | | 3/1987 | ........... | A01K 1/0114 |
| WO | WO-0223977 A2 * | | 3/2002 | ........... | A01K 1/0107 |
| WO | WO-02054859 A2 * | | 7/2002 | ........... | A01K 1/0263 |
| WO | WO-2008092243 A1 * | | 8/2008 | ........... | A01K 1/0114 |

* cited by examiner

PET CARRIER INCLUDING DETACHABLE LITTER BOX

CROSS-REFERENCE TO RELATED APPLICATION

The present patent application/patent is a continuation-in-part (CIP) of co-pending U.S. patent application Ser. No. 15/426,419, filed on Feb. 7, 2017, and entitled "PAT CARRIER INCLUDING DETACHABLE LITTER BOX," which claims the benefit of priority of U.S. Provisional Patent Application No. 62/292,893, filed on Feb. 9, 2016, and entitled "PET CARRIER INCLUDING DETACHABLE LITTER BOX," the contents of both of which are incorporated in full by reference herein.

FIELD OF THE INVENTION

The present invention relates generally to the pet care field. More specifically, the present invention relates to a pet carrier including a detachable litter box. The detachable litter box utilizes a removable grate through which pet waste may pass when a pet is housed and/or transported therein. The detachable litter box also utilizes separable pet carrier and litter pan components, with the grate integrated into the bottom of the pet carrier.

BACKGROUND OF THE INVENTION

A variety of conventional pet carriers are well known to those of ordinary skill in the art. These pet carriers are typically manufactured from a plastic or metallic mesh material. When a pet is disposed therein, papers or the like may be disposed in the bottom of the pet carrier to catch and retain pet waste. This is uncomfortable and unsanitary for the pet and a user alike. In response, some pet carriers have been developed that incorporate a metallic mesh bottom and a removable litter drawer or the like. Disadvantageously, such pet carriers are difficult to clean and fail to provide a mobile litter box.

Accordingly, what is still needed in the art is a pet carrier that includes a detachable litter box that is easy to use and clean. The detachable litter box should utilize a removable grate through which pet waste may pass when a pet is housed and/or transported therein. Alternatively, the detachable litter box also should also utilize separable pet carrier and litter pan components, with the grate integrated into the bottom of the pet carrier.

BRIEF SUMMARY OF THE INVENTION

In various exemplary embodiments, the present invention provides such a pet carrier that includes a detachable litter box that is easy to use and clean. The detachable litter box utilizes a removable grate through which pet waste may pass when a pet is housed and/or transported therein. The detachable litter box is also capable of being attached to the bottom of a conventional pet carrier for use and/or storage via an optional strap.

In one exemplary embodiment, the present invention provides a pet carrier assembly, including: an upper cage housing; and a lower litter pan coupled to the upper cage housing; wherein the lower litter pan is detachable from the upper cage housing and includes a removable waste grate disposed in a bottom portion thereof. The upper cage housing includes a hinged door structure operable for providing access to an interior portion of the upper cage housing. The upper cage housing includes one or more window grates operable for providing ventilation to an interior portion of the upper cage housing. Alternatively, the upper cage housing includes one or more arrays of holes operable for providing ventilation to an interior portion of the upper cage housing. Finally, the upper cage housing includes a handle operable for allowing the upper cage housing to be lifted. The pet carrier assembly also includes one or more coupling mechanisms for coupling the lower litter pan to the upper cage housing. The lower litter pan includes a cut away operable for providing access to an interior portion of the lower litter pan. Optionally, the pet carrier assembly further includes a moisture absorbent material disposed between the removable waste grate and a bottom of the lower litter pan.

In another exemplary embodiment, the present invention provides a method for providing a pet carrier assembly, including: providing an upper cage housing; and providing a lower litter pan coupled to the upper cage housing; wherein the lower litter pan is detachable from the upper cage housing and includes a removable waste grate disposed in a bottom portion thereof. The upper cage housing includes a hinged door structure operable for providing access to an interior portion of the upper cage housing. The upper cage housing includes one or more window grates operable for providing ventilation to an interior portion of the upper cage housing. Alternatively, the upper cage housing includes one or more arrays of holes operable for providing ventilation to an interior portion of the upper cage housing. Finally, the upper cage housing includes a handle operable for allowing the upper cage housing to be lifted. The method for providing a pet carrier assembly also includes providing one or more coupling mechanisms for coupling the lower litter pan to the upper cage housing. The lower litter pan includes a cut away operable for providing access to an interior portion of the lower litter pan. Optionally, the method for providing a pet carrier assembly further includes providing a moisture absorbent material disposed between the removable waste grate and a bottom of the lower litter pan.

In a further exemplary embodiment, the present invention provides a detachable litter box for a pet carrier assembly, including: a lower litter pan configured to be coupled to one or more of an upper cage housing and a lower cage housing of the pet carrier assembly; wherein the lower litter pan is detachable from the one or more of the upper cage housing and the lower cage housing of the pet carrier assembly and includes a removable waste grate disposed in a bottom portion thereof. The detachable litter box for a pet carrier assembly also includes one or more coupling mechanisms for coupling the lower litter pan to the one or more of the upper cage housing and the lower cage housing of the pet carrier assembly. The lower litter pan includes a cut away operable for providing access to an interior portion of the lower litter pan. Optionally, the detachable litter box for a pet carrier assembly further includes a moisture absorbent material disposed between the removable waste grate and a bottom of the lower litter pan.

In a still further exemplary embodiment, the present invention provides a pet carrier assembly, including: a cage housing adapted to selectively contain a pet; and a lower litter pan adapted to be selectively coupled to and removed from a bottom portion of the cage housing; wherein the bottom portion of the cage housing includes a waste grate that forms at least a portion of a floor of the cage housing and is selectively disposed within or adjacent to an interior portion of the lower litter pan with the bottom portion of the cage housing. The pet carrier assembly also includes a solid removable floor disposed in the bottom portion of the cage housing and adapted to cover the waste grate, and a seal disposed about a periphery of the removable floor. The cage housing includes a hinged door structure operable for providing access to an interior portion of the cage housing. The cage housing includes one or more window grates operable for providing ventilation to an interior portion of the cage housing. Alternatively, the cage housing includes one or more arrays of holes operable for providing ventilation to an interior portion of the cage housing. The cage housing includes a handle operable for allowing the cage housing to be lifted. The pet carrier assembly further includes one or more coupling mechanisms for selectively coupling the lower litter pan to and releasing the lower litter pan from the cage housing. Optionally, the lower litter pan includes a cut away operable for providing access to an interior portion of the lower litter pan. Optionally, the pet carrier assembly further includes a moisture absorbent material disposed between the waste grate of the bottom of the cage housing and a bottom of the lower litter pan.

In a still further exemplary embodiment, the present invention provides a method for providing a pet carrier assembly, including: providing a cage housing adapted to selectively contain a pet; and providing a lower litter pan adapted to be selectively coupled to and removed from a bottom portion of the cage housing; wherein the bottom portion of the cage housing includes a waste grate that forms at least a portion of a floor of the cage housing and is selectively disposed within or adjacent to an interior portion of the lower litter pan with the bottom portion of the cage housing. The method also includes providing a solid removable floor disposed in the bottom portion of the cage housing and adapted to cover the waste grate, and a seal disposed about a periphery of the removable floor. The cage housing includes a hinged door structure operable for providing access to an interior portion of the cage housing. The cage housing includes one or more window grates operable for providing ventilation to an interior portion of the cage housing. Alternatively, the cage housing includes one or more arrays of holes operable for providing ventilation to an interior portion of the cage housing. The cage housing includes a handle operable for allowing the cage housing to be lifted. The pet carrier assembly further includes one or more coupling mechanisms for selectively coupling the lower litter pan to and releasing the lower litter pan from the cage housing. Optionally, the lower litter pan includes a cut away operable for providing access to an interior portion of the lower litter pan. Optionally, the pet carrier assembly further includes a moisture absorbent material disposed between the waste grate of the bottom of the cage housing and a bottom of the lower litter pan.

BRIEF DESCRIPTION OF THE DRAWINGS

The present invention is illustrated and described herein with reference to the various drawings, in which like reference numbers are used to denote like assembly components/reference numbers, as appropriate, and in which.

DETAILED DESCRIPTION OF THE INVENTION

Figure 1:
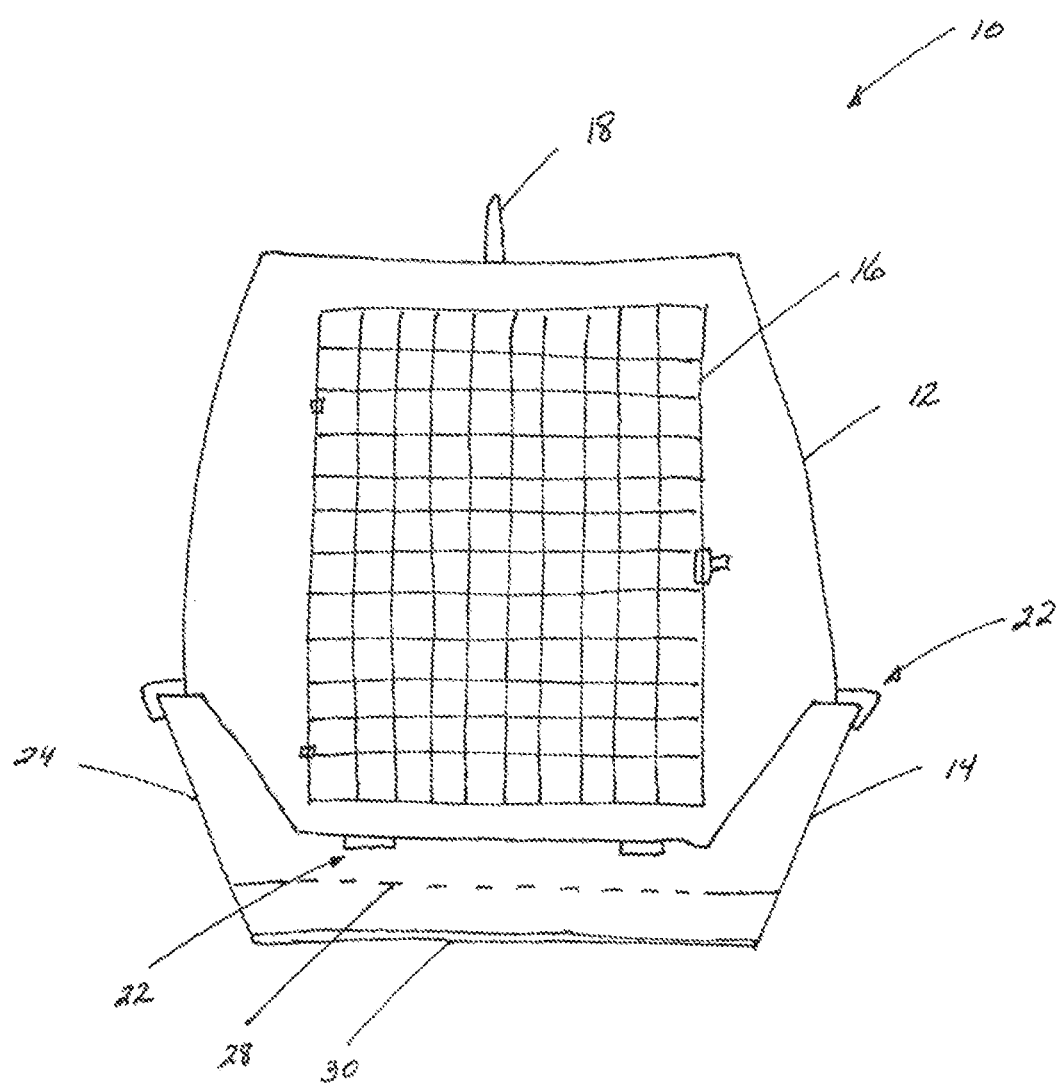
FIG. 1 is a planar front view of one exemplary embodiment of the pet carrier including a detachable litter box of the present invention.
Figure 2:
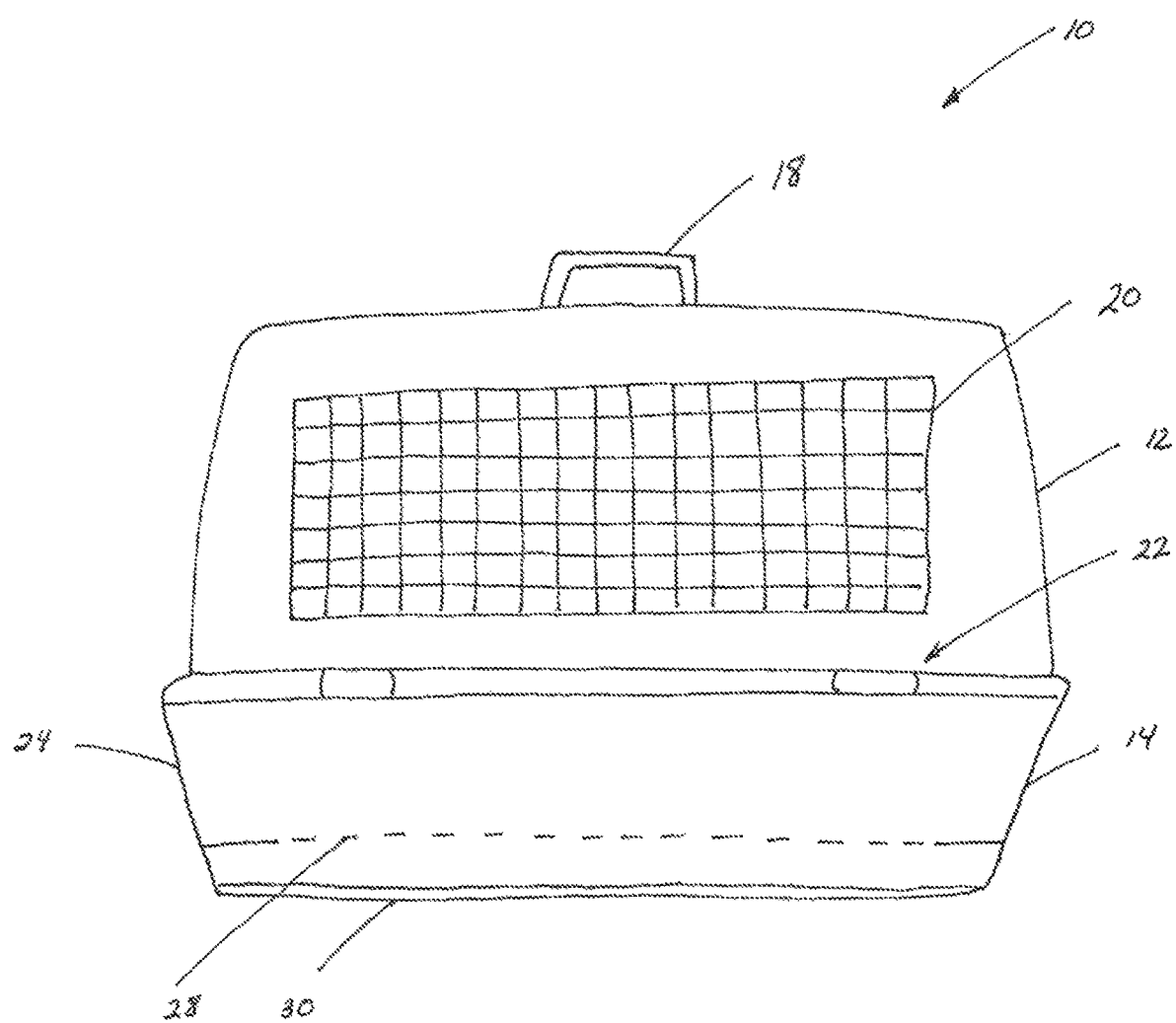
FIG. 2 is a planar side view of one exemplary embodiment of the pet carrier including a detachable litter box of the present invention.

Referring now specifically to FIGS. 1 and 2, in one exemplary embodiment, the pet carrier 10 of the present invention includes a cage housing 12 and a detachable litter box 14. As with conventional pet carriers, the cage housing 12 includes a prismatic lid or roof structure that is manufactured from a rigid plastic or metallic mesh material. The cage housing 12 may also be manufactured from a semi-rigid or flexible plastic or fabric material, optionally including a rigid internal or external support frame structure. One or more hinged latching door grates or other structures 16 (FIG. 1) are provided through which a pet may be disposed in/removed from the pet carrier 10. A handle 18 is provided by which the pet carrier 10 may be carried. One or more additional window grates or other structures 20 (FIG. 2) are also provided in order to provide adequate ventilation to a pet disposed within the pet carrier 10. These additional window grates or other structures 20 may simply take the form of arrays of ventilation holes disposed through the front, back, and/or sides, of the cage housing 12. The cage housing 12 is appropriately sized to adequately accommodate an intended pet, such as a rodent, a cat, a small dog, a large dog, an exotic animal, etc. In the exemplary embodiment illustrated, the cage housing 12 has a slightly tapering cross-sectional area from bottom to top, although this is not absolutely necessary.

The cage housing 12 is selectively coupled to the detachable litter box 14 via a plurality of brackets, clips, thumb screws, and or the like 22. Optionally, the bottom (open) edge of the cage housing 12 sits on a shelf or within a recess manufactured into the top (open) edge of the litter pan 24 of the detachable litter box 14. Alternatively, the top (open) edge of the litter pan 24 contacts a shelf or sits within a recess manufactured into the bottom (open) edge of the cage housing 12. In general, the litter pan 24 includes a typical prismatic pan or tray structure manufactured from a rigid plastic or metallic material. The litter pan 24 may also be manufactured from a semi-rigid or flexible plastic or fabric material, optionally including a rigid internal or external support frame structure.

Figure 3A:
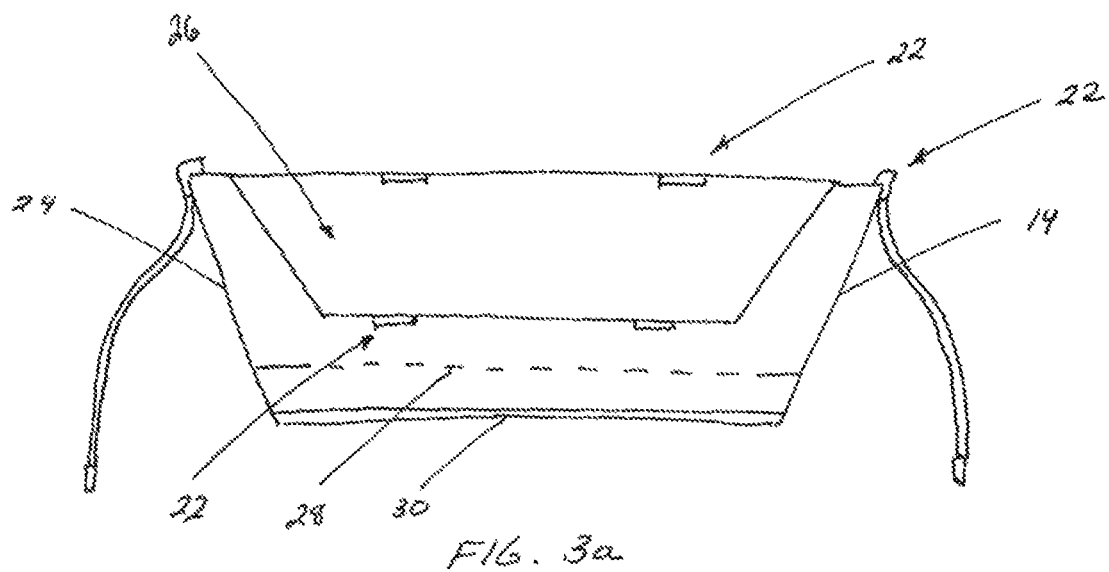
FIGS. 3a and 3b are front and top planar view of one exemplary embodiment of the detachable litter box of the present invention.
Figure 3B:
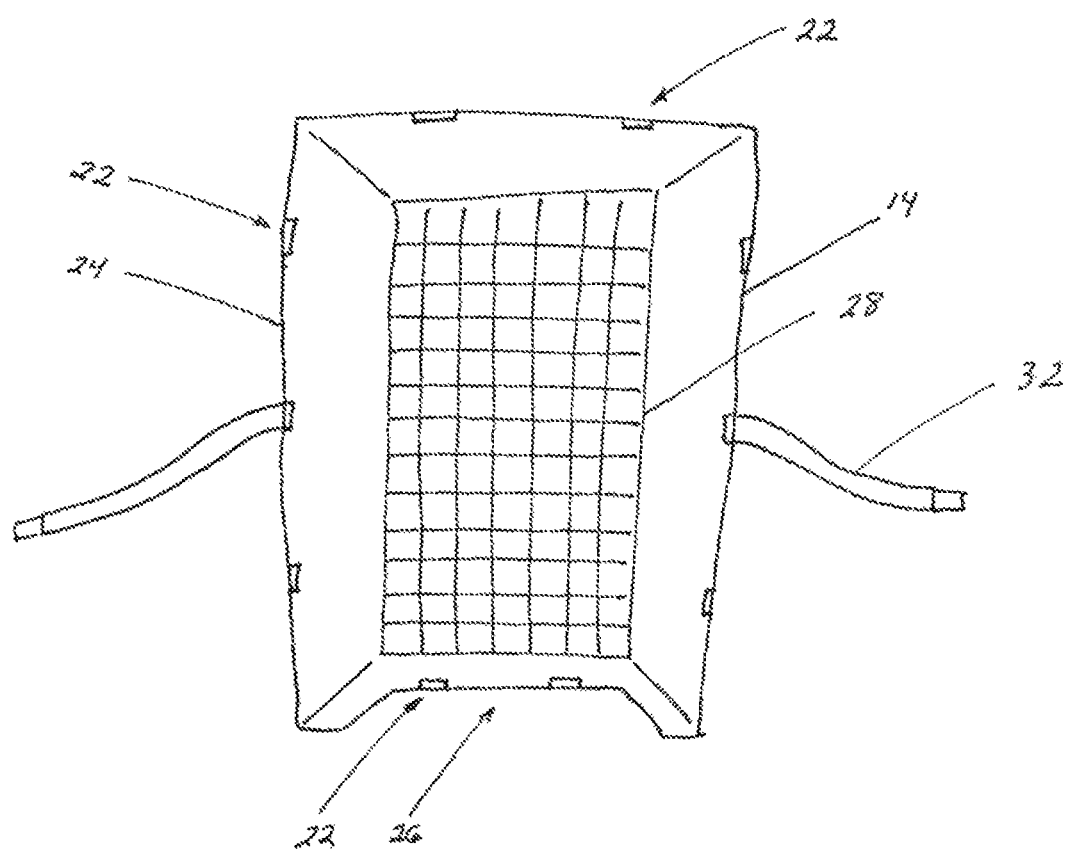

Referring now specifically to FIGS. 3a and 3b, in one exemplary embodiment, the litter pan 24 may have sides of substantially equal height or it may include a cut away 26 in one or both ends for accommodating the one or more hinged latching door grates or other structures 16 (FIG. 1) and/or providing easier pet access. In the exemplary embodiment illustrated, the litter pan 24 has a slightly tapering cross-sectional area from top to bottom, although this is not absolutely necessary. Preferably, the litter pan 24 is manufactured such that it is impervious to and retains any liquids disposed within the pet carrier 10.

A waste grate 28 through which liquids and small solids may pass is disposed within and forms the pet floor of the litter pan 24. This waste grate 28 sits within a frame structure, on a ledge structure, and/or on one or more support structures manufactured into/disposed within the litter pan 24, such that the waste grate 28 is held spaced apart from the bottom of the litter pan 24, thereby allowing pet waste to pass through the waste grate 28 and into/onto the bottom of the litter pan 24. Optionally, the bottom of the litter pan 24 is lined with a moisture-absorbent pad or the like 30. Litter may also be used for this purpose. It should be noted that the waste grate 28 may cover all or only a selected portion of the bottom of the litter pan 24. Preferably, the waste grate 28 is removable for convenient cleaning of the detachable litter box 14 when it is decoupled from the cage housing 12.

Optionally, the detachable litter box 14 includes one or more straps or other attachment mechanisms that allow it to be secured to the upper (and optionally lower) housing of another (conventional) pet carrier, for use and/or storage.

Figure 4:
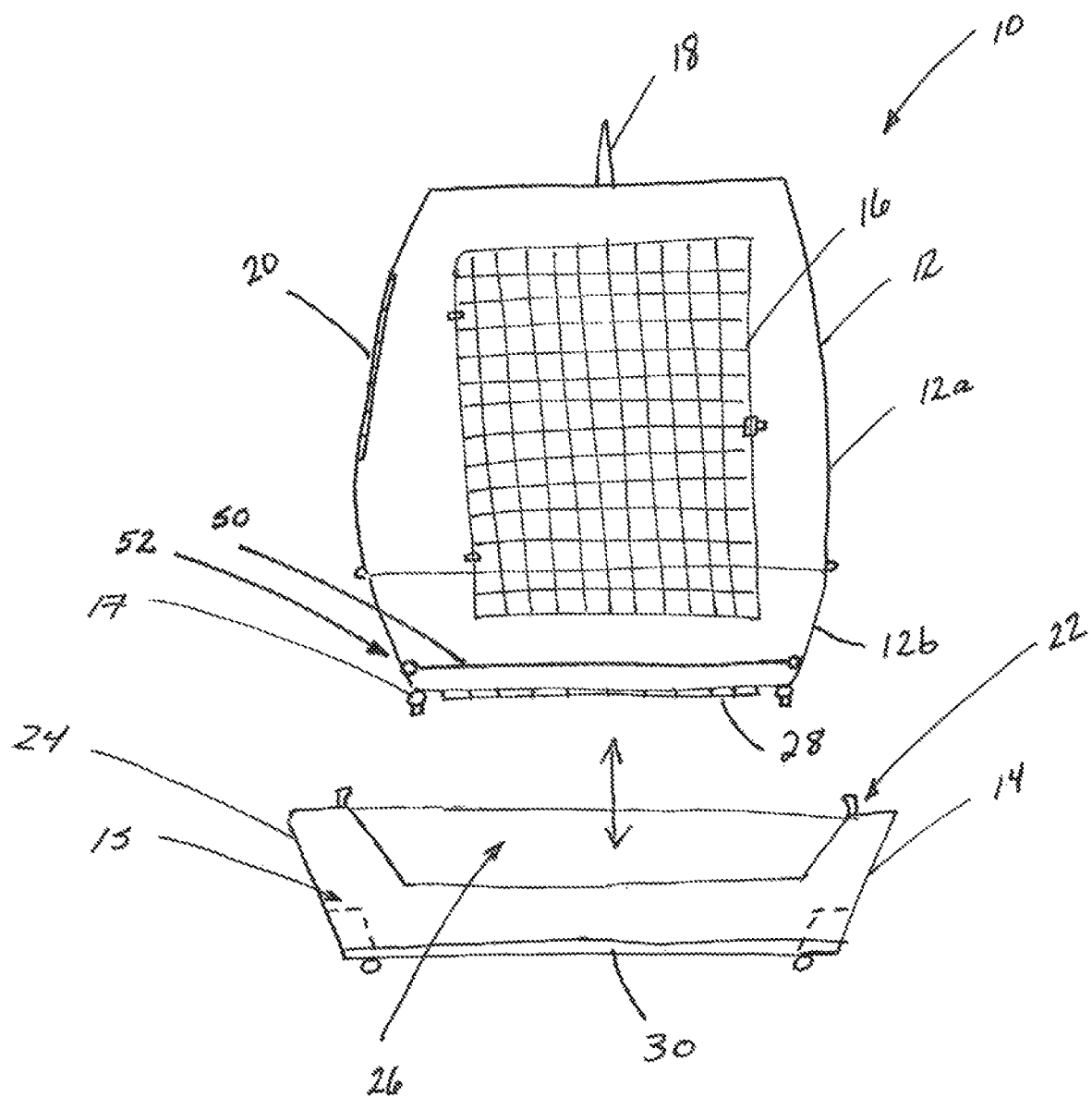
FIG. 4 is a planar front view of another exemplary embodiment of the pet carrier including a detachable litter box of the present invention, with the pet carrier and the detachable litter box in a separated configuration.

Referring now specifically to FIG. 4, in another exemplary embodiment, the pet carrier 10 of the present invention includes a cage housing 12 and a detachable litter box 14. As with conventional pet carriers, the cage housing 12 includes a prismatic lid or roof structure that is manufactured from a rigid plastic or metallic mesh material. The cage housing 12 may also be manufactured from a semi-rigid or flexible plastic or fabric material, optionally including a rigid internal or external support frame structure. One or more hinged latching door grates or other structures 16 are provided through which a pet may be disposed in/removed from the pet carrier 10. A handle 18 is provided by which the pet carrier 10 may be carried. One or more additional window grates or other structures 20 are also provided in order to provide adequate ventilation to a pet disposed within the pet carrier 10. These additional window grates or other structures 20 may simply take the form of arrays of ventilation holes disposed through the front, back, and/or sides, of the cage housing 12. The cage housing 12 is appropriately sized to adequately accommodate an intended pet, such as a rodent, a cat, a small dog, a large dog, an exotic animal, etc. In the exemplary embodiment illustrated, the cage housing 12 has a slightly tapering cross-sectional area from bottom to top, although this is not absolutely necessary. Further, as illustrated, the cage housing includes an upper cage housing 12a that is integrally formed with or otherwise secured to a lower cage housing 12b. The lower case housing 12b thus forms a box or floor that supports the pet in the pet carrier 10, while the upper cage housing forms a roof or shelter that covers or protects the pet, with both structures serving to contain the pet. As is conventional, these structures may be integrally formed, bolted together, clipped together, etc. Here, the waste grate 28 on which the pet is supported and through which the pet goes to the bathroom forms a part or all of the floor of the lower cage housing 12b. This waste grate 28 is thus removable from the litter box 14 with the cage housing 12 for transport of the pet separate from the litter box 14.

The cage housing 12 is again selectively coupled to the detachable litter box 14 via a plurality of brackets, clips, thumb screws, and or the like 22. Optionally, the lower cage housing 12b sits on a shelf or within a recess 15 manufactured into the top (open) edge of the litter pan 24 of the detachable litter box 14. Alternatively, the cage housing 12 sits on integrated or attached legs or supports 17 within the litter pan 24. In general, the litter pan 24 includes a typical prismatic pan or tray structure manufactured from a rigid plastic or metallic material. The litter pan 24 may also be manufactured from a semi-rigid or flexible plastic or fabric material, optionally including a rigid internal or external support frame structure. Here, of note, the pet carrier 12 is vertically disposable within and removable from the litter box 14, such that the litter box 14 may be attached to the pet carrier 12 for temporary use and removed for cleaning and/or storage when not needed or desired. When assembled together, the components form a conveniently movable unit. This is different from cages with horizontally removable litter drawers, which may be difficult and inconvenient to separate and clean.

Again, in one exemplary embodiment, the litter pan 24 may have sides of substantially equal height or it may include a cut away 26 in one or both ends for accommodating the one or more hinged latching door grates or other structures 16 and/or providing easier pet access. In the exemplary embodiment illustrated, the litter pan 24 has a slightly tapering cross-sectional area from top to bottom, although this is not absolutely necessary. Preferably, the litter pan 24 is manufactured such that it is impervious to and retains any liquids disposed within the pet carrier 10.

The waste grate 28 through which liquids and small solids may pass is disposed within and forms the pet floor of the cage housing 12. This waste grate 28 sits within a frame structure and/or in one or more support structures manufactured into/disposed within the bottom of the cage housing 12, such that the waste grate 28 is ultimately held spaced apart from the bottom of the litter pan 24, thereby allowing pet waste to pass through the waste grate 28 and into/onto the bottom of the litter pan 24. Optionally, the bottom of the litter pan 24 is again lined with a moisture-absorbent pad or the like 30. Litter may also be used for this purpose. It should be noted that the waste grate 28 may cover all or only a selected portion of the bottom of the lower cage housing 12b. Optionally, the waste grate 28 is removable for convenient cleaning when it is decoupled from the cage housing 12.

As is further illustrated in FIG. 4, the cage housing 12 preferably includes a solid, removable carrier floor 50 that is used to selectively cover the waste grate 28 and provide a conventional, solid floor for a pet when the cage housing 12 is used to transport the pet without the litter pan 24 being attached and/or usable. This carrier floor 50 conformally nests within the bottom portion of the cage housing 12 and/or above/within the waste grate 28. Fluids are optionally sealed within the cage housing 12 via a seal 52 that extends around the periphery of the carrier floor 50, which also serves to secure the carrier floor 50 within the cage housing 12.

Although the present invention is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims.

What is claimed is:

1. A pet carrier assembly, comprising:
   a cage housing adapted to selectively contain a pet, wherein the cage housing comprises an upper cage housing that forms a roof of the cage housing coupled to a lower cage housing that forms a floor of the cage housing; and
   a lower litter pan adapted to be selectively coupled to and removed from a bottom portion of the cage housing comprising the lower cage housing;
   wherein the cage housing, including the floor, forms an enclosure adapted to hold the pet within the cage housing separate from the lower litter pan, wherein the floor comprises a waste grate that forms at least a portion thereof and that is adapted for liquid and solid pet waste to pass therethrough, wherein the floor is selectively disposed within or adjacent to an interior portion of the lower litter pan, and wherein the bottom portion of the cage housing comprising the lower cage housing sits within the lower litter pan.

2. The pet carrier assembly of claim 1, further comprising a solid removable floor disposed in the bottom portion of the cage housing and adapted to cover the waste grate.

3. The pet carrier assembly of claim 2, further comprising a seal disposed about a periphery of the removable floor.

4. The pet carrier assembly of claim 1, wherein the cage housing comprises a hinged door structure operable for providing access to an interior portion of the cage housing.

5. The pet carrier assembly of claim 1, wherein the cage housing comprises one or more window grates operable for providing ventilation to an interior portion of the cage housing.

6. The pet carrier assembly of claim 1, wherein the cage housing comprises one or more arrays of holes operable for providing ventilation to an interior portion of the cage housing.

7. The pet carrier assembly of claim 1, wherein the cage housing comprises a handle operable for allowing the cage housing to be lifted.

8. The pet carrier assembly of claim 1, further comprising one or more coupling mechanisms for selectively coupling the lower litter pan to and releasing the lower litter pan from the cage housing.

9. The pet carrier assembly of claim 1, wherein the lower litter pan comprises a cut away operable for providing access to an interior portion of the lower litter pan.

10. The pet carrier assembly of claim 1, further comprising a moisture absorbent material disposed between the waste grate of the bottom of the cage housing and a bottom of the lower litter pan.

11. A method for providing a pet carrier assembly, comprising:
    providing a cage housing adapted to selectively contain a pet, wherein the cage housing comprises an upper cage housing that forms a roof of the cage housing coupled to a lower cage housing that forms a floor of the cage housing; and
    providing a lower litter pan adapted to be selectively coupled to and removed from a bottom portion of the cage housing comprising the lower cage housing;
    wherein the cage housing, including the floor, forms an enclosure adapted to hold the pet within the cage housing separate from the lower litter pan, wherein the floor comprises a waste grate that forms at least a portion thereof and that is adapted for liquid and solid pet waste to pass therethrough, wherein the floor is selectively disposed within or adjacent to an interior portion of the lower litter pan, and wherein the bottom portion of the cage housing comprising the lower cage housing sits within the lower litter pan.

12. The method for providing the pet carrier assembly of claim 11, further comprising providing a solid removable floor disposed in the bottom portion of the cage housing and adapted to cover the waste grate.

13. The method for providing the pet carrier assembly of claim 12, further comprising providing a seal disposed about a periphery of the removable floor.

14. The method for providing the pet carrier assembly of claim 11, wherein the cage housing comprises a hinged door structure operable for providing access to an interior portion of the cage housing.

15. The method for providing the pet carrier assembly of claim 11, wherein the cage housing comprises one or more window grates operable for providing ventilation to an interior portion of the cage housing.

16. The method for providing the pet carrier assembly of claim 11, wherein the cage housing comprises one or more arrays of holes operable for providing ventilation to an interior portion of the cage housing.

17. The method for providing the pet carrier assembly of claim 11, wherein the cage housing comprises a handle operable for allowing the cage housing to be lifted.

18. The method for providing the pet carrier assembly of claim 11, further comprising providing one or more coupling mechanisms for selectively coupling the lower litter pan to and releasing the lower litter pan from the cage housing.

19. The method for providing the pet carrier assembly of claim 11, wherein the lower litter pan comprises a cut away operable for providing access to an interior portion of the lower litter pan.

20. The method for providing the pet carrier assembly of claim 11, further comprising providing a moisture absorbent material disposed between the waste grate of the bottom of the cage housing and a bottom of the lower litter pan.

* * * * *